Feb. 22, 1966  H. R. NEWELL  3,237,102
AUTOMATIC RANGE SWITCHING VOLTMETER CIRCUIT INCLUDING MEANS
FOR REDUCING THE MEASURED SIGNAL DURING RANGE SWITCHING
Filed Sept. 18, 1961  2 Sheets-Sheet 1
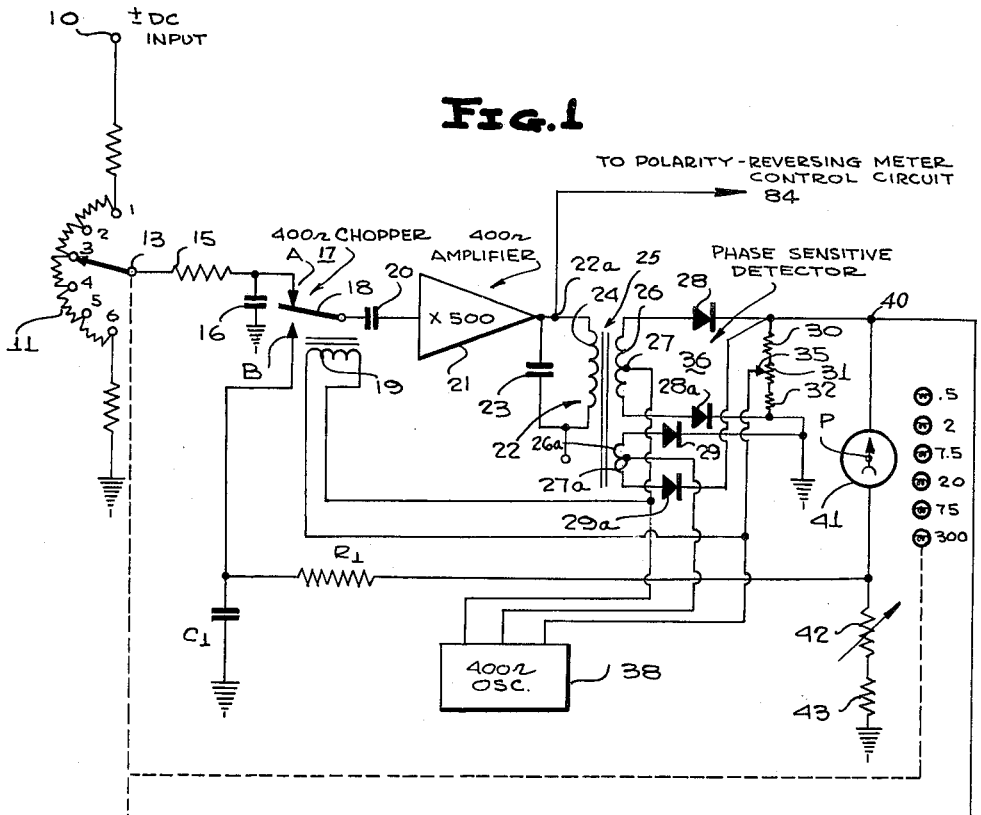
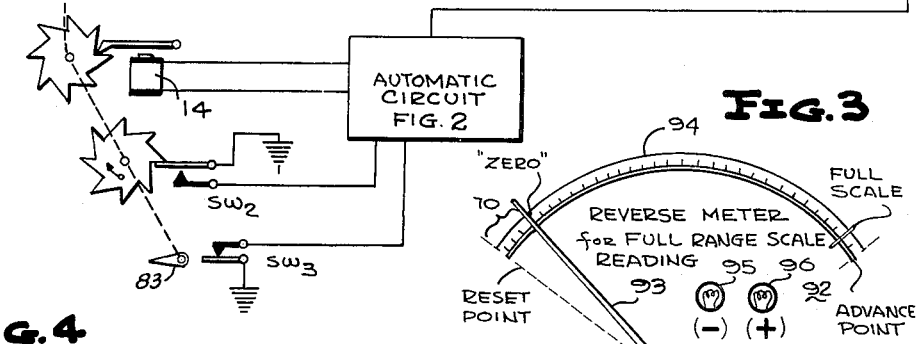
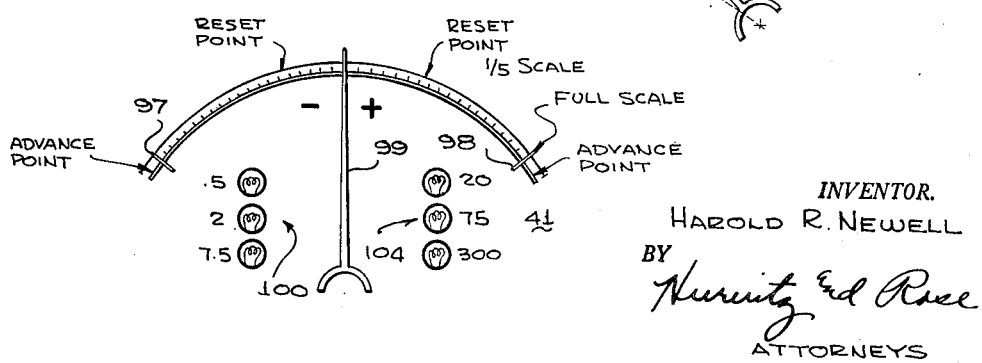
*INVENTOR.*
HAROLD R. NEWELL
BY
*ATTORNEYS*

INVENTOR.
HAROLD R. NEWELL
BY *Hurwitz and Rose*
ATTORNEYS

United States Patent Office 3,237,102
Patented Feb. 22, 1966

3,237,102
AUTOMATIC RANGE SWITCHING VOLTMETER CIRCUIT INCLUDING MEANS FOR REDUCING THE MEASURED SIGNAL DURING RANGE SWITCHING
Harold R. Newell, Bradford, N.H., assignor to Mesur-Matic Electronics Corporation, Warner, N.H., a corporation of Delaware
Filed Sept. 18, 1961, Ser. No. 138,692
2 Claims. (Cl. 324—115)

The present invention relates generally to meters, and more particularly to automatic range shifting meters having provision for automatic adjustment of the range scale utilized, whereby automatically always to bring the meter indication within the scale of the meter to provide increased speed and accuracy in reading values by means of the meter, and to minimize the possibilities of damage to the meter by connection of the meter to a source of electrical signal of greater magnitude than that for which scale selection has been made.

It has been the general practice in connection with voltmeters, ammeters, and the like, to provide for range selection by means of a multi-position switch which is manually operated. In many meters the pointer or indicator is caused to swing over a scale having multiple ranges, and it is essential, then, that the operator read the position of the pointer against that scale for which meter range selection has been made, and that he avoid setting the meter range to one value and reading the position of the pointer against a non-corresponding scale.

In using a multi-range voltmeter, for example only, having a manual range selector, the operator preferably should know in advance the approximate value of the voltage to be measured, so that there may be assurance that the value of the voltage does not so greatly exceed the setting of the voltmeter range that damage will occur when the voltmeter is connected. It has, accordingly, been good practice heretofore to set the voltmeter for the highest range on initially connecting the voltmeter to a line. If the meter shows too low a voltage for accurate reading, then the range selection switch is shifted to progressively lower scales until an appropriate value can be read. It follows that in making a long series of measurements considerable time is lost in adjusting the range of the voltmeter utilized.

The difficulties above specified can be overcome by employing an automatic voltmeter which is provided with automatic range selection devices. Thereby, the chances of human error are minimized, the chance of damage to the meter is minimized or obviated entirely, and considerable time is saved. In such instruments it is common to provide an indication of range employed by means of lamps, or the like, by illuminating only the correct pointer scale, or in some cases multiple scales are utilized and an indication provided as to which scale the pointer position should be read against.

It is the broad object of the present invention to provide a novel meter having provision for automatic range changing.

It is a further object of the present invention to provide a range changing meter which employs a feed-back chopper amplifier coupled with a comparison circuit, for transferring a voltage reading from an input terminal to a meter, whereby high stability can be realized and no manual control or adjustment of zero setting is required.

It is a further object of the invention to provide a range shifting meter utilizing two cascaded chopper amplifiers, one of which is employed for providing signal to a meter, and the other of which is utilized for providing signal to a stepping switch which effects range selection.

It is a further object of the invention to provide a range switching meter which has no controls except an on-off switch, whereby inexperienced personnel are competent to operate the meter.

Another object of the invention resides in the provision of a range setting meter capable of reading negative or positive values, indifferently.

A further object of the invention resides in the provision of a D.C. bi-polar voltmeter, in which voltage is converted to A.C. current for purpose of amplification, and into pulsating D.C. current for purpose of measurement, the pulsating D.C. current being converted to steady D'C. voltage for purpose of comparison with the voltage to be measured.

Briefly describing a preferred embodiment of the present invention, as applied to a voltmeter, the measurement circuit includes a chopper type amplifier circuit with feedback. A phase comparison circuit driven by the amplifier drives a meter, to indicate the magnitude of an input signal to the amplifier and to develop feed-back. The meter employed may be either a zero-center device indicating to the right for positive values of input voltage and to the left for negative values, or preferably, a full range-scale-reading polarity reversing meter having zero at an end point of the scale with polarity indication lights thereon. The amplifier circuit includes a mechanical chopper, whereby the zero of the meter remains stable. A voltage to be measured is fed into a resistor divider string. A switch operated by a stepper relay taps off from junction points along the divider string and feeds the voltage from a selected junction point to one input of the chopper amplifier, the other chopper input is supplied with voltage from the phase comparator.

The stepper switch may be of the uni-directional type, so that ranges repeat for each group of positions of the stepper switch. Provision is made for automatically returning the range switching stepper to its low range after each measurement.

The chopper amplifier system converts D.C. voltage differential available at the inputs of the chopper to a 400 cycle per second square wave, which is amplified electronically in a relatively high gain A.C. amplifier, and fed to a tuned circuit which translates the square wave into a sinusoidal wave which is then fed to phase comparison detector. The latter converts the sinusoidal wave to a pulsating D.C. current of the same polarity as the input voltage. The pulsating D.C. current is supplied to a sensitive ammeter, for driving the meter movement, and is also converted to steady voltage and used as one of the inputs to the chopper amplifier, the other input signal being the voltage to be measured. The amplifier thus attempts to reduce the differential signal at its input to zero.

The automatic range selecting circuit is adjusted so that when a voltage to be measured causes the meter to indicate above full scale, the stepper is caused to advance the range switch to the next higher range, where it stops so that the meter can be read, or if the meter still reads over-scale, the stepper continues to advance the range until a range is reached where the indication of the meter is on scale. When the voltage being measured is removed, or the voltage drops in value so that the meter indicates below ⅕ scale, the stepper is caused to rotate the range switch through the higher ranges, if any, to the lowest available, where it stops if the meter indicates on scale or advances up range to where it does indicate on scale. If the input voltage being measured is removed, the stepper rotates the range switch to the lowest range and remains at that setting.

To accomplish range selection, the pulsating voltage across the meter is filtered and supplied to a diode chopper which converts it to a 400 c.p.s. square wave. The latter is amplified in a highly stabilized feed-back amplifier having a gain of, say 100, and the output of the latter is rectified in a peak to peak type diode circuit. The D.C. voltage at the output of the diode circuit is of the same polarity and magnitude whether the meter indicates positive or negative. The latter voltage is supplied to the grid of a vacuum tube, which controls a relay, the relay contacts being closed when the meter indicates just above full scale. To this end the vacuum tube is normally biased back so as to supply no anode current until the voltage at its grid attains a predetermined value representative of a voltage input magnitude to the system which is at least just above full scale. When the relay is energized the range of stepper switch is advanced one step. When the stepper switch operates, the input to the second chopper is removed, which in turn effects the energization of the relay, releasing the stepper switch, whereupon the input to the second amplifier is again applied. For each application of voltage, in effect, a test is made to indicate whether the voltage is sufficiently high to require a further operation of the stepper switch. The stepping operation continues until an adequate range has been obtained.

On the other hand when the meter indicates below ⅕ scale (a value which is preselected, and which can be adjusted), the voltage is fed to the grid of a further vacuum tube which controls a neon lamp circuit. The neon lamp is caused to fire into the input to the second amplifier, generating a sufficient voltage at the grid of the relay control amplifier to simulate the condition of above scale indication, so that the stepper causes range to change until the switch reaches the lowest range. At this point the programing contacts open, removing the voltages generated by the neon tube circuit, and the stepper terminates its operation.

The above and still further objects, features and advantages of the present invention will become apparent upon consideration of the following detailed description of one specific embodiment thereof, especially when taken in conjunction with the accompanying drawings, wherein:

FIGURE 1 is a schematic circuit diagram of a system according to the invention;

Figure 2:
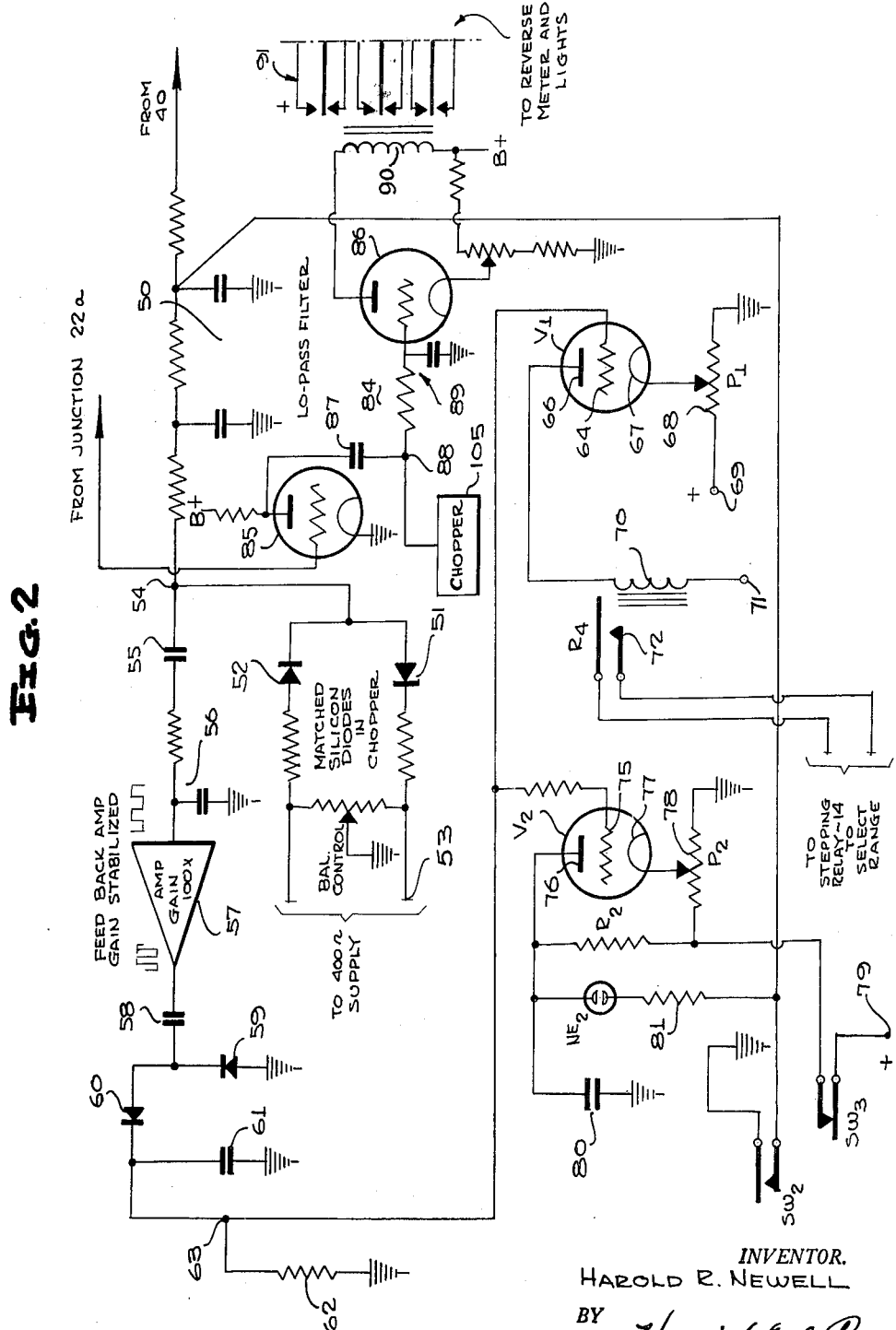
FIGURE 2 is a schematic diagram of the automatic circuit indicated in the labeled block of FIGURE 1, and FIGURES 3 and 4 are diagrammatical illustrations of a meter according to the invention.

Referring to FIGURE 1, the reference numeral 10 denotes an input terminal for direct voltage, which can be positive or negative with respect to ground. In series between the terminal 10 and ground is a series of resistances 11, having junction points identified by the numerals 1, 2, 3, 4, 5 and 6, which can be selected in sequence by a movable contact 13 operated by a stepping switch 14. The voltage at movable contact 13 is applied via a low pass filter comprising series resistance 15 and shunt capacity 16 to one stationary contact A of a 400 c.p.s. mechanical chopper 17. The remaining stationary contact B is connected through a large condenser C1 to ground, while the movable contact 18 is vibrated by a coil 19, supplied with 400 c.p.s. current from a suitable supply, hereinafter described. The vibrating contact 18 is coupled through a capacitor 20 to the input of a two tube amplifier 21, having a gain of about 500, for example. The output of the amplifier 21 is a parallel tuned circuit 22, tuned specifically for the 400 c.p.s. chopper frequency. A junction 22a provides an output to condition a circuit for controlling the polarity reversing full range scale meter of the invention, as will be explained in conjunction with FIGURE 2. Tuned circuit 22 has the function of translating the square waves supplied by the chopper, and amplified by the amplifier 21, into sinusoidal waves. The tuned circuit 22 includes in shunt a capacitor 23 and an inductance 24, which is the primary winding of a transformer 25. The latter has secondary windings 26 and 26a which are center tapped at points 27 and 27a respectively, and the end points of which supply diodes 28, 28a, 29 and 29a which are correspondingly poled with respect to the center taps 27 and 27a respectively, and across the cathodes of which is connected three resistances in series, these being identified by the reference numerals 30, 31 and 32, the cathode of the diode 29 being grounded. The center resistance 31 is supplied with variable output tap 35, and is used to permit balance of the bridge constituted of the secondary windings 26 and 26a, the diodes 28, 28a, 29 and 29a and the resistances 30, 31 and 32. The 400 c.p.s. supply 38 is connected between the contact 35 and the center taps 27 and 27a. The same 400 cycle supply is applied to the chopper coil 19, and to the phase sensitive bridge identified generally by the reference numeral 36, at terminals 27 and 35, respectively. Accordingly, the polarity of the output of of the bridge 36 is determined by the polarity of the voltage supplied to the terminal 10.

The cathode of the diode 28 is connected to a point 40, from which is connected in series a sensitive ammeter 41 and a pair of series resistances 42, 43, of which the resistance 42 is adjustable. The junction of the meter 41 and the resistance 42 is connected through a resistance R1 to the ungrounded terminal of a condenser C1.

The condenser C1 acquires a D.C. voltage, determined by the average voltage at the output of the phase comparison bridge 36, in both polarity and magnitude. To the extent that the contacts A and B are at different potentials, an input voltage is available for the amplifier 21. However, this input voltage results in an output voltage which is fed back to the condenser C1 in such sense as to tend to reduce the difference of voltages at the contacts A and B, respectively. The resistance R1 and the condenser C1 in this respect act as a filter or smoothing circuit, so that the voltage across the condenser C1 is essentially smooth D.C. The feed-back voltage is a function of the average current in meter 41, and, accordingly, when the system attains a state of balance, the current in the meter 41, and consequently the position of the pointer P of the meter 41, is a function of the voltage at the variable tap 13, and the latter in turn is a fixed proportion of the input voltage supplied to the terminal 10.

Referring to FIGURE 2 which shows the schematic diagram of the automatic circuit, the voltage available at the point 40 is applied to a low pass filter 50, from which the voltage proceeds to a shunt chopper of the electronic type. The shunt chopper comprises two series connected silicon diodes 51, 52, which are supplied with 400 cycle signal at terminals 53 and produces a chopped or square wave 400 c.p.s. signal at a junction point 54 of the diodes 51, 52, on which there is a signal having a peak to peak amplitude representative of the D.C. voltage and polarity avaliable at the tap 13. This square wave is transferred by a condenser 55 and by a low pass filter 56 to the input of a feed-back amplifier 57, having a gain of about 100, and the gain of which is highly stabilized in terms of the design of the amplifier and the feed-back provided therein. The amplifier 57 is conventional, per se, and accordingly its details are not described or illustrated.

The output of the amplifier 57 is coupled by a condenser 58 to a peak detector comprising diode 59 connected in shunt, and diode 60 connected in series, the cathode of the diode 59 being connected to the anode of the diode 60, and the anode of the diode 59 being grounded. Connected between the cathode of the diode 60 and ground is a storage condenser 61. The peak detector comprising diodes 59, 60 and condenser 61, is conventional per se, and generates a voltage across condenser 61 which is positive regardless of the polarity of the D.C. voltage at 54, since it is independent of the phase of the output of the amplifier 57. This voltage can extend between 0 and 12+ volts, for a specific design of the presently described embodiment of my invention. Connected across the condenser 61 is a leakage resistance 62, which permits the voltage across condenser 61 to reduce, as input voltage to the peak rectifier is reduced. The voltage across resistance 62 and across condenser 61, which appears at a junction point 63, is applied to the grid 64 of a triode VI, having an anode 66 and a cathode 67. The cathode 67 is connected to an adjustable positive bias circuit 68, consisting of a fixed resistance connected between a positive voltage terminal 69 and ground, and a suitable slider. Accordingly the cathode 67 can be set to have a predetermined positive bias. The anode of the triode V1 is connected in series with a relay coil 70 and positive voltage terminal 71. Contacts 72 of the relay 70 control a circuit to stepping relay 14, causing the latter to advance one step in response to each closure of the contacts 72, and consequently in response to each energization of the relay coil 70. The bias of the triode V1 is so adjusted that the triode V1 conducts current whenever the voltage at the terminal 63 exceeds 12 volts, but otherwise does not conduct current.

The input of the filter 50 can be connected to ground through a switch SW2 which is normally open, and which is closed on each advance of the stepper relay of the stepper switch, and consequently is closed for each energization of the relay 70.

The point 63 is further connected to the grid 75 of a triode V2, having an anode 76 and a cathode 77. The cathode 77 is connected to an adjustable bias source 78, which applies thereto an adjustable positive voltage. The anode 76 of the triode V2 is connected to a positive voltage terminal 79 through normally closed contacts SW3 and a load resistance R2. The contacts SW3 are normally closed, and are arranged to be opened only when the stepper switch is at its lowest range position. The anode 76 of the triode V2 is connected to a condenser 80, one terminal of which is grounded and the remaining terminal of which is connected through a neon tube NE2 and a current limiting resistance 81, to the ungrounded side of the switch SW2.

As previously described, the junction 22a in the plate circuit of amplifier 21 provides an output to condition the full range-reading polarity reversing meter of the invention. The advantage of the full range meter is that 90% of the full scale may be used, thereby providing higher accuracy of readings, instead of the 50% usage of the scale in the zero-center meter.

The control circuit for the full scale range meter is indicated generally at 84 in FIGURE 2, and includes an amplifier triode 85 and a relay control triode 86. An input from junction 22a to the grid of triode 85 is synchronously amplified therein and fed through a coupling capacitor 87 to a junction 88. A square wave input signal to junction 88 is supplied by a chopper circuit 105 similar to the chopper circuit having diodes 51 and 52. The square wave input signal represents the peak to peak amplitude and polarity of the D.C. voltage at tap 13. The pulsating D.C. at junction 88 is smoothed in low pass filter 89 and fed to the grid of relay control triode 86. The output of triode 86 controls, through a switching coil 90, the position of the two position switches 91 which are located in the full range meter so that the meter pointer will read in the same direction on the scale for both positive and negative polarities.

The polarity reversing full range scale meter of the invention is shown generally at 92 in FIGURE 3. Meter 92 has a coil mounted pointer 93 and a scale 94 on the face thereof. The pointer 93 is shown in the zero position of the scale. Polarity indicating lights are located on the face of the meter, the negative polarity light being at 95 and the positive polarity light being at 96. The lights 95 and 96 may conveniently be of different colors.

If the output of triode 86 is of positive polarity, the contact arms of switches 91 swing to the upper, positive contacts to condition meter 92 so that the positive polarity indicating light is energized.

FIGURE 4 shows a meter having conventional "zero-center" scale with the full scale positions at 97 and 98 to which a pointer 99 swings respectively according to polarity. Indicator lights 100 each accompanied by the indicated numerical legend adjacent thereto provide automatic measurement range indication. Measurement range lights 100 may be mounted in the meter of FIGURE 3 in exactly the same manner.

In operation triode V1 has its bias adjusted so that as soon as the pointer 99 of meter 41 exceeds full scale position (97 or 98) in a negative or positive sense, or exceeds the full scale position of pointer 93 of meter 92, i.e. when the pointer reaches either of the positions marked "advance point," the triode V1 supplies current to the relay 70, causing the latter to close the contacts 72 and thus advancing the selector switch position one step. When the selector position advances one step the contact 13 is stepped to the next succeeding one of the numbers of the tap positions 1–6. Assuming that initially it is on position 1 it will then be advanced to position 2 thereby reducing the voltage applied to contact A.

On the other hand, if the meter reading drops below ⅕ scale, the tube 72 cuts down its anode current sufficiently to increase voltage at neon tube NE2 to firing value. When neon tube NE2 fires a high voltage pulse is transferred to filter 50, resulting in a high voltage pulse at junction point 63, and hence an operation of the stepper switch.

When the stepper switch is at its lowest position, i.e. the meter is in its lowest range, a cam 83 opens SW3, disabling the circuit which energizes neon tube NE2.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for switching range scale of a meter comprising a source of direct signal to be measured by said meter, means for converting said direct signal to an alternating signal of peak magnitude equal to the magnitude of said direct signal, an alternating current amplifier having stabilized gain amplifying said alternating signal, means for converting the amplified alternating signal to a steady direct voltage, means including a step switch for changing range of said meter, means responsive to said steady direct voltage only when said steady direct voltage is above a value corresponding with full scale deflection of said meter for energizing said step switch, means responsive to each energization of said step switch for transiently reducing said steady direct voltage to a negligible value, means responsive to said steady voltage only when said step switch is in other than lowest range position and to a predetermined relatively low value of said steady voltage for energizing said step switch.

2. The combination according to claim 1 wherein said last means includes means for applying a high direct voltage as said source of direct signal.

References Cited by the Examiner

UNITED STATES PATENTS

| | | | |
|---|---|---|---|
| 2,459,730 | 1/1949 | Williams | 324—118 |
| 2,606,943 | 8/1952 | Barker | 324—115 |
| 2,865,000 | 12/1958 | Newell | 324—115 |
| 2,940,071 | 6/1960 | Kindred | 324—99 |
| 3,014,135 | 12/1961 | Hewlett | 250—214 |

OTHER REFERENCES

Ad No. 4882, prepared by L. C. Cole Co. on 425A Microvolt Ammeter for Hewlett-Packard, 1958 announcement of basic new instruments.

Ad No. 5024, prepared by L. C. Cole Co. on 405AR D.C. Digital Voltmeter for Hewlett-Packard, received at Patent Office, Feb. 10, 1959.

WALTER L. CARLSON, *Primary Examiner.*

FREDERICK M. STRADER, *Examiner.*